United States Patent [19]

Nagano et al.

[11] Patent Number: 5,371,624
[45] Date of Patent: Dec. 6, 1994

[54] REFLECTED FLUORESCENCE MICROSCOPE

[75] Inventors: Takashi Nagano; Keiji Shimizu; Kazuo Kajitani; Masaaki Iwase, all of Tokyo, Japan

[73] Assignee: Olympus Optical Co., Ltd., Tokyo, Japan

[21] Appl. No.: 982,468

[22] Filed: Nov. 27, 1992

[30] Foreign Application Priority Data

Nov. 29, 1991 [JP] Japan ................................. 3-317100
Jan. 10, 1992 [JP] Japan ................................. 4-003076

[51] Int. Cl.⁵ ................................................ G02B 21/06
[52] U.S. Cl. ................................... 359/389; 359/368; 359/385
[58] Field of Search ........................... 359/368–390, 359/885, 887–891

[56] References Cited

U.S. PATENT DOCUMENTS

| | | | |
|---|---|---|---|
| 3,860,813 | 1/1975 | Herzog et al. | 359/389 |
| 3,973,827 | 8/1976 | Uetake | 359/389 |
| 4,705,356 | 11/1987 | Berning et al. | 359/590 |
| 4,756,611 | 7/1988 | Yonekubo et al. | 359/371 |
| 5,214,494 | 5/1993 | Inaba et al. | 359/590 |

FOREIGN PATENT DOCUMENTS

| | | | |
|---|---|---|---|
| 164680 | 12/1985 | European Pat. Off. | 359/385 |
| 2188447 | 9/1987 | European Pat. Off. | 359/385 |
| 1447166 | 8/1976 | United Kingdom. | |

*Primary Examiner*—Scott J. Sugarman
*Assistant Examiner*—Thong Nguyen
*Attorney, Agent, or Firm*—Frishauf, Holtz, Goodman & Woodward

[57] ABSTRACT

A reflected fluorescence microscope is used to observe a fluorescent image of a stained specimen by reflected illumination, and includes a light source, an excitation filter for converting light from the light source into a plurality of narrow-band excitation lights, a dichroic mirror for reflecting the narrow-band excitation lights emerging from the excitation filter toward the specimen and transmitting therethrough the light emerging from the specimen, an absorption filter for absorbing an extra wavelength component from light emerging from the dichroic mirror and transmitting therethrough a wavelength component of the fluorescent image, an optical system for forming the fluorescent image of the specimen from the wavelength component transmitted through the absorption filter, and a transmission wavelength shifting filter for adjusting the ratio of the quantities of light in units of fluorochromes.

14 Claims, 11 Drawing Sheets

REFLECTED FLUORESCENCE MICROSCOPE

BACKGROUND OF THE INVENTION

1. Field of the Invention

The present invention relates to a reflected fluorescence microscope which is utilized to observe a living tissue or cell in the fields of medicine, biology, and the like, and which has an excitation filter and an absorption filter and, more particularly, to a reflected fluorescence microscope in which the excitation wavelength and the absorption wavelength can be adjusted.

2. Description of the Related Art

Generally, reflected fluorescence microscopes are widely used in medicine, biology, and other fields to detect a protein, a gene, and the like marked with a fluorescent label on a living tissue or cell.

In recent years, as various types of fluorochromes have been developed, the reflected fluorescence microscopes are used particularly to study the mutual positional relationship among specific substances and the localization of a specific substance in a cell by means of multiple stain using various types of materials as the fluorescent labels.

When specimens stained with various fluorescent materials are to be observed using a reflected fluorescence microscope of this type, a fluorescent filter set consisting of an excitation filter, a dichroic mirror, and an absorption filter is prepared for each specific fluorochrome, and an optimum combination of the excitation and absorption wavelength regions is obtained by selectively using the fluorescent filter sets, thereby observing the specific fluorochrome.

In this manner, the conventional reflected fluorescence microscope has fixed excitation and absorption wavelength regions for each fluorescent filter set. Therefore, in order to observe various types of specimens stained with fluorochromes with the optimum excitation and absorption wavelength regions, a considerably large number of fluorescent filter sets are needed. Then, the number of components is increased, leading to an increase in manufacturing costs.

When the mutual positional relationship among the multiple fluorochromes that stain the fluorescent specimen is to be studied, the respective fluorescent images of the fluorescent specimen must be recorded on a photograph or a video memory in multiple exposure. Therefore, the conventional reflected fluorescence microscope is not suitable for detection of fluorochromes having high discoloration speeds or detection of the mutual positional relationship among the fluorochromes by using time as a parameter.

When the fluorescent filter sets are selectively used, off-centering of the observation optical system occurs depending on the component precision of the dichroic mirror, the absorption filter, and the like, and an error occurs in the mutual positional relationship detected from the fluorescent image.

SUMMARY OF THE INVENTION

The present invention has been made to solve the problems described above, and has as its object to provide a reflected fluorescence microscope which can adjust the spectral transmittance characteristics of fluorescent filter sets to optimum values according to the fluorochromes of the specimen without exchanging excitation and absorption filters.

It is another object of the present invention to provide a reflected fluorescence microscope capable of observing a fluorescent specimen stained with multiple fluorochromes without exchanging a fluorescent filter set and capable of obtaining a fluorescent image that can be observed easily by appropriately changing the fluorescent intensities of the respective fluorochromes with a simple operation.

According to the present invention, there is provided a reflected fluorescence microscope for observing a fluorescent image of a stain specimen by reflected illumination, comprising:

a light source for supplying light used for the reflected illumination;
 an excitation filter for converting the light from the light source into a plurality of narrow-band excitation lights each having narrow bands;
 a dichroic mirror, disposed at a position where the lights from the excitation filter and a light from the specimen are incident thereon, for reflecting the narrow-band excitation lights emerging from the excitation filter toward the specimen and for transmitting therethrough the light emerging from the specimen that emits a plurality of types of fluorescences upon being excited by the narrow-band excitation lights;
 an absorption filter for absorbing or reflecting an extra wavelength component from light emerging from the dichroic mirror and transmitting therethrough a wavelength component of the fluorescent image;
 an optical system for forming the fluorescent image of the specimen from the wavelength component transmitted through the absorption filter; and
 an interference filter, disposed on an optical path through which the light supplied from the light source passes until being incident on the dichroic mirror, and having a variable transmission wavelength band defined by a transmittance and a wavelength, for selectively causing, with respect to a pair of narrow-band excitation lights among the plurality of narrow-band excitation lights, a first state, wherein the interference filter has partly low transmittance characteristics on a short wavelength side of one narrow-band excitation light and high transmittance characteristics on a long wavelength side of the other narrow-band excitation light, and a second state, wherein the interference filter has partly low transmittance characteristics on a long wavelength side of the other narrow-band excitation light and high transmittance characteristics on a short wavelength side of one narrow-band excitation light.

More specifically, the transmission wavelength shifting filter has transmittance characteristics for forming a trapezoidal transmission wavelength band, and the transmission characteristics are changed so that the transmission wavelength band is shifted in a direction of the wavelength while a shape thereof is essentially maintained.

According to the present invention having the arrangement as described above, the interference filter is held in the reflected illumination optical path before the dichroic mirror to be rotatable in an axis perpendicular to the optical axis. When this filter is inclined with respect to the optical axis, the transmittance characteristics of the interference filter are changed so that, in the transmission wavelength band, part of the long-wavelength side narrow band is gradually cut and that the interference filter has a high transmittance in the low-wavelength side band.

As a result, the quantities of light of the plurality of narrow-band excitation lights emerging from the excitation filter are changed, and accordingly the ratio of the intensity of the plurality of fluorescences emitted from the specimen is changed. Therefore, the brightnesses of a plurality of types of fluorescent images can be easily adjusted, and efficient excitation can be performed.

Alternatively, a transmission wavelength shifting filter having first transmittance characteristics wherein the transmittance is continuously increased from the short wavelength side to the long wavelength side within a predetermined wavelength range to form a first transmission wavelength band, and a second transmission wavelength shifting filter having second transmittance characteristics wherein the transmittance is continuously decreased from the long wavelength side to the short wavelength side within a predetermined wavelength range to form a second transmission wavelength band, are selectively changed.

According to the present invention having the arrangement as described above, the transmission wavelength bands can be changed by selectively changing a first filter having a high transmittance with respect to short wavelength-side narrow-band excitation light and a low transmittance with respect to long wavelength-side narrow-band excitation light, and a second filter having a low transmittance with respect to short wavelength-side narrow-band excitation light and a high transmittance with respect to long wavelength-side narrow-band excitation light.

Furthermore, according to the present invention, there is also provided a reflected fluorescence microscope, comprising:

a light source for supplying light used for reflected illumination;

at least one fluorescent filter unit for changing transmittance characteristics in accordance with a wavelength component of the fluorescent image, the fluorescent filter unit having an excitation filter for converting the light from the light source into a narrow-band excitation light, a dichroic mirror, disposed at a position where the light from the excitation filter and the Light from the specimen are incident thereon, for reflecting the narrow-band excitation light emerging from the excitation filter toward the specimen and for transmitting therethrough the light emerging from the specimen that emits a fluorescence upon being excited by the narrow-band excitation light, and an absorption filter for absorbing an extra wavelength component from light emerging from the dichroic mirror and transmitting therethrough a wavelength component of the fluorescent image, and the excitation and absorption filters each being constituted by an interference filter formed of a dielectric multilayer film and each being supported to be pivotal about an axis perpendicular to an optical axis;

an interlock mechanism for pivoting the excitation and absorption filters of the fluorescent filter unit in an interlocked manner; and an optical system for forming the fluorescent image of the specimen from a wavelength component transmitted through the absorption filter.

According to the present invention having the arrangement as described above, the excitation and absorption filters are interlocked through the interlock mechanism and can respectively be inclined at predetermined amounts with respect to the corresponding optical axes. When the excitation and absorption filters are inclined from, e.g., a state perpendicular to the optical axes, the incident angles of light incident on these filters are gradually increased. When the incident angles are increased, the transmission wavelength band is shifted.

Therefore, when the maximum transmittance wavelengths of the excitation and absorption filters are set at appropriate values and the excitation and absorption filters are pivoted in accordance with the fluorochromes of the specimen, optimum excitation and absorption wavelength ranges can be set without exchanging the fluorescent filter set.

DETAILED DESCRIPTION OF THE PREFERRED EMBODIMENTS

The preferred embodiments of the present invention will be described below with reference to the accompanying drawings.

Figure 1:
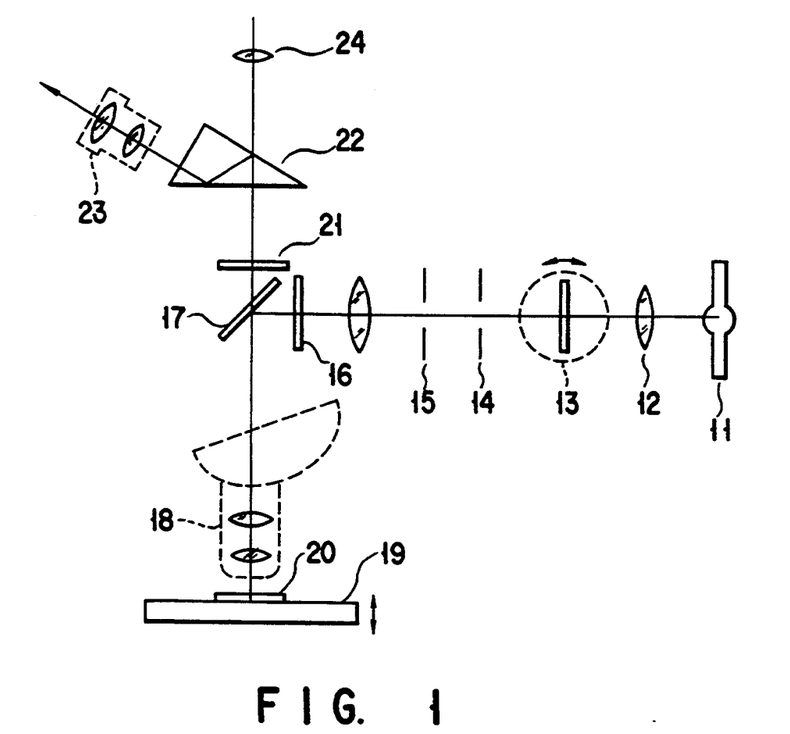
FIG. 1 is a view showing the arrangement of a reflected fluorescence microscope according to the first embodiment of the present invention.
Figure 7:
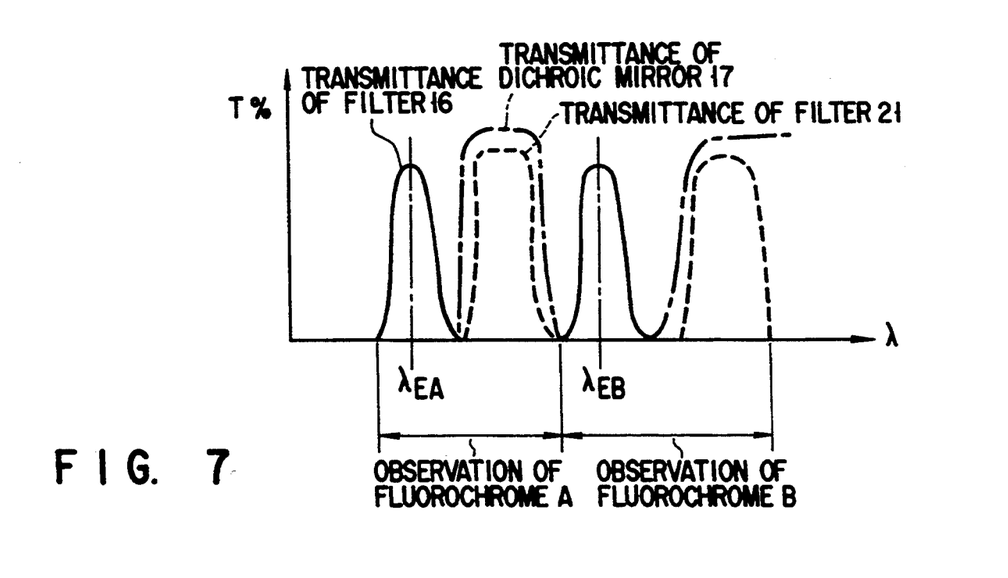
FIG. 7 is a graph showing the transmittance characteristics of a fluorescent filter set.

FIG. 1 is a view showing the arrangement of the optical system of a reflected fluorescence microscope according to the first embodiment of the present invention. Reference numeral 11 denotes a light source, e.g., a mercury lamp; 12, a collector lens for collecting light projected by the light source 11; and 13, an interference filter serving as a rotatably held transmission wavelength shifting filter which has a rotation axis perpendicular to the output optical axis of the collector lens 12. An aperture stop 14, a field stop 15, an excitation filter 16 having transmittance characteristics shown in FIG. 7, and a dichroic mirror 17 having transmittance characteristics shown in FIG. 7 are disposed on the output optical axis of the interference filter 13 in this order.

Reference numeral 18 denotes an objective lens; and 19, a vertically movable stage on which a specimen 20 is placed. Incident illumination light emerging from the dichroic mirror 17 is radiated on the specimen 20 through the objective lens 18.

Object light (fluorescent image) emerging from the specimen 20 is guided to the dichroic mirror 17 through the objective lens 18 again. An absorption filter 21 having transmittance characteristics shown in FIG. 7 and a beam splitter 22 are disposed on the exit side of the dichroic mirror 17. The beam splitter 22 is removably inserted in the optical path to switch the optical path between the observation and photographing systems as required. An eyepiece optical system 23 is disposed on the observation optical path of the beam splitter 22, and a photographing eyepiece 24 is disposed on the photographing optical path of the beam splitter 22.

The excitation filter 16, the dichroic mirror 17, and the absorption filter 21 constitute a fluorescent filter set. The excitation filter 16 has two high-transmittance regions $\lambda_{EA}$ and $\lambda_{EB}$ for effectively exciting two types of fluorochromes A and B, as shown in FIG. 7. Each of the dichroic mirror 17 and the absorption filter 21 has a high-transmittance region falling between the two regions $\lambda_{EA}$ and $\lambda_{EB}$ and a high-transmittance region of a transmittance higher than that of the region $\lambda_{EB}$. The specimen 20 is stained with multiple fluorochromes to emit two types of fluorescences upon excitation by excitation lights having central wavelengths at wavelengths $\lambda_{EA}$ and $\lambda_{EB}$.

Figure 2:
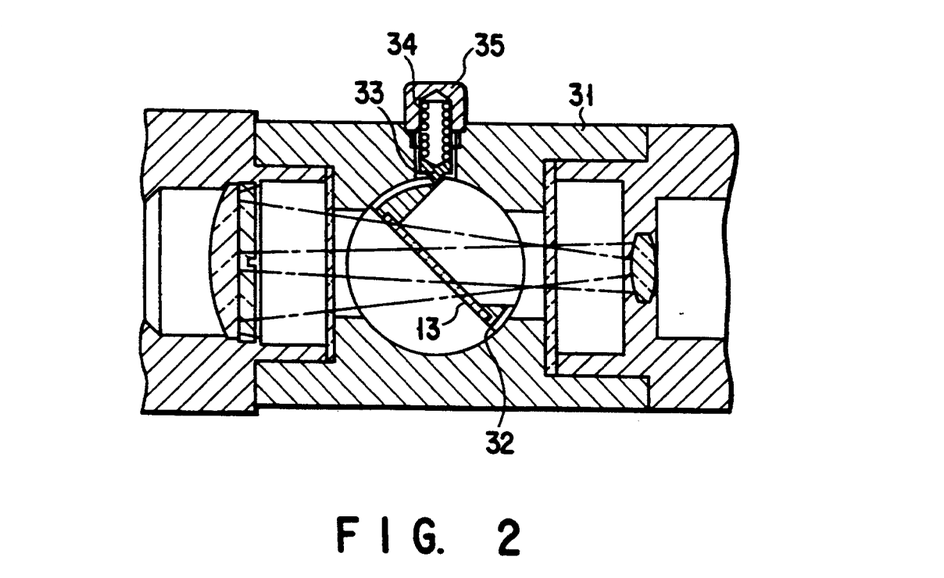
FIG. 2 is a sectional view showing the rotary holding mechanism of an interference filter provided to the reflected fluorescence microscope of the first embodiment.

FIG. 2 is a sectional view showing the rotary holding mechanism of the interference filter 13 adopted in the reflected fluorescence microscope according to the present invention. The rotary holding mechanism is provided to a portion of a reflected illumination projection tube that transmits the illumination light of the light source 11 to the fluorescent filter set.

More specifically, the rotary holding mechanism is constituted by a tube body 31 forming part of the projection tube, a filter frame 32 fitted in the tube body 31 to rotatably hold the interference filter 13 in an axis perpendicular to the optical axis, a pin 33 capable of pushing the filter frame 32, a coil spring 34 for pushing the pin 33, a spring receptacle 35, fixed to the tube body 31, for supporting the pin 33 and the coil spring 34, and the like.

In the rotary holding mechanism, the interference filter 13 is rotated by an external electrical or mechanical, and the pin 33 applies an urging force to fix the filter frame 32, i.e., the interference filter 13 at an arbitrary angular position upon reception of the urging force from the coil spring 34.

The operation of the reflected fluorescence microscope having the structure as described above will be described.

Figure 3:
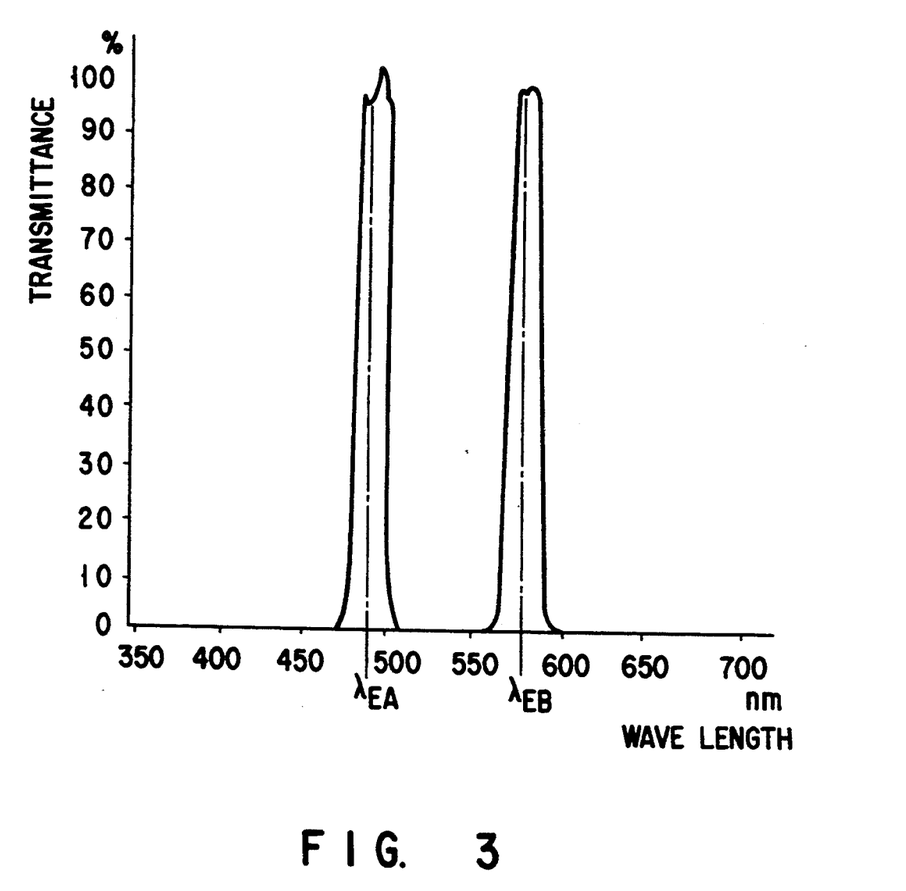
FIG. 3 is a graph showing the transmission wavelength band of an excitation filter obtained when an interference filter is not provided.

When the interference filter 13 does not exist, light projected by the light source 11 is collected by the collector lens 12, and is incident on the excitation filter 16. Only a plurality of lights each having narrow-band excitation light wavelengths, as shown in FIG. 3, are transmitted through the excitation filter 16, are reflected by the dichroic mirror 17, and are radiated on the specimen 20 on the stage 19. Since the specimen 20 is stained with two types of fluorochromes in advance, it emits two types of fluorescences upon excitation by the light having two excitation wavelength bands $\lambda_{EA}$ and $\lambda_{EB}$, as shown in FIG. 3.

The fluorescences emitted from the specimen 20 are transmitted through the objective lens 18 and the dichroic mirror 17. Light components having unnecessary wavelength bands are absorbed or reflected by the absorption filter 21, and only a wavelength of the fluorescent image is extracted. This fluorescent image is guided to the observation eyepiece optical system or photographing system.

Due to a difference in fluorescent intensity among the respective fluorochromes, it is difficult to balance the two types of fluorescent intensities to obtain a desired brightness.

Conventionally, in order to adjust the fluorescent intensities of the two types of the fluorochromes, for example, the characteristics of the absorption filter 21 in the observation optical path are varied, or an auxiliary filter is inserted in the observation optical path to partially cut the fluorescence emitted by the specimen 20. Alternatively, an ND filter having a neutral density and not exhibiting selective spectral absorption is inserted in the illumination optical path, or the aperture stop 14 is adjusted.

With the former method of cutting fluorescence, however, the excitation light for exciting the fluorescence which is eventually cut becomes wasteful. Then, the fluorescence utilization efficiency is degraded by this wasteful light, and the specimen 20 is subjected to an extra damage, which is not preferable. On the other hand, with the latter method of adjusting the light intensity, since the intensities of the excitation light components having two wavelengths cannot be adjusted independently of each other, the ratio of the intensity of the two types of fluorescences cannot be changed.

Figure 4A:
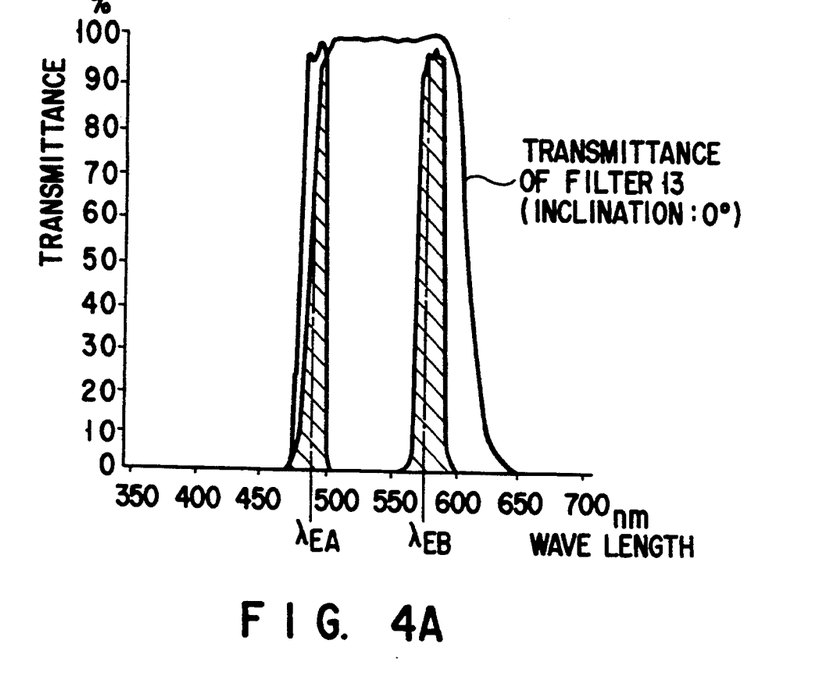
FIG. 4A is a graph showing the transmittance characteristics obtained when the interference filter is inclined to the long wavelength side and the wavelength of the excitation light obtained when both interference and excitation filters are used.
Figure 4B:
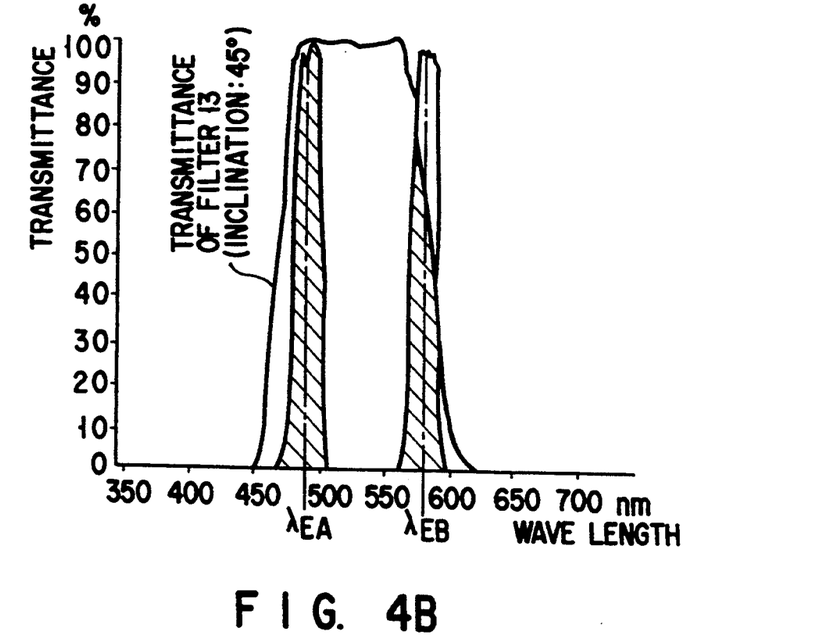
FIG. 4B is a graph showing the transmittance characteristics obtained when the interference filter is inclined to the short wavelength side and the wavelength of the excitation light obtained when both interference and excitation filters are used.

Hence, according to the present invention, the interference filter 13 for shifting the transmission wavelength which has the rotary holding mechanism as shown in FIG. 2 is inserted in the reflected illumination light path, thereby obtaining illumination light components having wavelengths as shown in FIGS. 4A and 4B. More specifically, the transmission wavelength shifting filter 13 is an interference filter, and the transmittance characteristics as shown in FIG. 4A can be obtained when the interference filter 13 is inserted perpendicularly (an inclination of 0°) with respect to the output optical axis of the collector lens 12. On the other hand, when the interference filter 13 inserted to be inclined at 45° with respect to an axis perpendicular to the output optical axis of the collector lens 12, the transmittance characteristics as shown in FIG. 4B can be obtained.

Generally, the conditions for interference of an interference filter can be represented by the following equation:

$$2t \cdot \cos\Phi = m\lambda$$

where $\lambda$ is the maximum transmittance wavelength, t is the optical thickness (including the phase difference caused in the interface of the dielectric by conversion into an optical path length) of the dielectric, and $\Phi$ is the reflection angle of the interface.

When the degree m is constant and the conditions for interference are constant, the wavelength $\lambda$ is proportional to $\cos\Phi$. $\Phi$ is a reflection angle and can be considered equivalent to the incident angle since it is conjugate to the incident angle from Snell's law.

When the incident angle is increased, $\cos\Phi$ is decreased, the wavelength $\lambda$ is also decreased simultaneously, and thus the maximum transmittance is gradually shifted to the low wavelength side. Therefore, when the interference filter 13 is gradually inclined from the axis perpendicular to the optical axis up to 45°, the transmittance wavelength band can be continuously shifted from the band as shown in FIG. 4A to the band as shown in FIG. 4B.

Furthermore, when both the interference filter 13 which is set in a direction (an inclination of 0°) perpendicular to the optical axis and the excitation filter 16 are employed, the obtained excitation light has the wavelengths indicated by the hatched portions in FIG. 4A. As is apparent from FIG. 4A, in the short excitation wavelength band $\lambda_{EA}$, part of the excitation light obtained by the excitation filter 16 which is in the short wavelength side is cut. On the other hand, in the long excitation wavelength band $\lambda_{EB}$, the ratio of the intensity of the two excitation wavelength bands $\lambda_{EA}$ and $\lambda_{EB}$ is changed since there is no influence of the interference filter 13.

As a result, the ratio of the intensity of the two types of fluorescences excited by the two excitation wavelength bands $\lambda_{EA}$ and $\lambda_{EB}$ can be changed.

When both the interference filter 13 which is set to be inclined at 45° from the axis perpendicular to the optical axis and the excitation filter 16 are employed, the obtained excitation light has the wavelengths indicated by the hatched portions in FIG. 4B. In this case, in the long excitation wavelength band $\lambda_{EB}$, of the excitation light obtained by the excitation filter 16, part of the excitation light obtained by the excitation filter 16 which is in the long wavelength side is cut. On the other hand, in the short excitation wavelength band $\lambda_{EA}$, the ratio of the intensity of the two excitation wavelength bands $\lambda_{EA}$ and $\lambda_{EB}$ can be changed since there is no influence of the interference filter 13. As a result, the ratio of the intensity of the two types of fluorescences excited by the two excitation wavelength bands $\lambda_{EA}$ and $\lambda_{EB}$ can be changed.

When the inclination of the interference filter 13 is gradually changed between the state of 0° and the state of 45°, that is, when the interference filter 13 is gradually inclined from 0°, as the state shown in FIG. 4A, toward 45°, the transmittance band of the interference filter 13 is shifted to the short-wavelength side in accordance with the angle of inclination. At this time, in the short wavelength band $\lambda_{EA}$, the region which is cut is gradually decreased, and the intensity of excitation light is increased. In the long excitation wavelength band $\lambda_{EB}$, since the wavelength of the excitation light partially overlaps the non-transmitting range of the interference filter 13, the region which is cut is gradually increased from the long wavelength side, and accordingly the intensity of excitation light is decreased.

Hence, as is apparent from the above description, the ratio of the intensities of the excitation lights having the bands $\lambda_{EA}$ and $\lambda_{EB}$ can be continuously changed. Accordingly, the ratio of the intensity of the two types of fluorescences excited by the excitation wavelength bands $\lambda_{EA}$ and $\lambda_{EB}$ can be continuously changed. Thus, when the inclination of the interference filter 13 is set at an arbitrary angle between the two states of 0° and 45°, the ratio of the intensities of the two types of fluorescences excited by the excitation wavelength bands $\lambda_{EA}$ and $\lambda_{EB}$ can be adjusted to a desired value.

Assume that a difference occurs in fluorescent intensity by two types of fluorochromes, or that a difference occurs in discoloration speed between two types of fluorescences. In this case, the balances in brightness of the two types of fluorescent images are different. Then, with the arrangement of the embodiment as described above, the ratio of the fluorescent intensities of the two types of fluorescences excited by excitation wavelength bands $\lambda_{EA}$ and $\lambda_{EB}$ can be adjusted to a desired value by changing the inclination of the interference filter 13, i.e., by a simple operation, so that a problem such as one fluorescent image is excessively bright or dark in observation or photographing can be solved. In addition, since this adjustment can be performed by controlling illumination light, a degradation in excitation efficiency as described above will not occur, and no extra damage will be applied to the specimen 20.

Figure 5A:
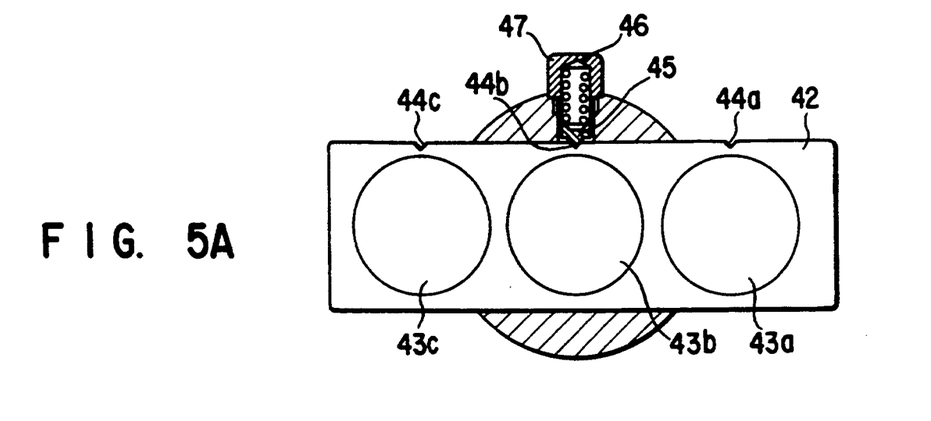
FIG. 5A is a view showing a filter selecting mechanism used in a reflected Fluorescence microscope according to the second embodiment of the present invention, and explaining positioning of the filter.
Figure 5B:
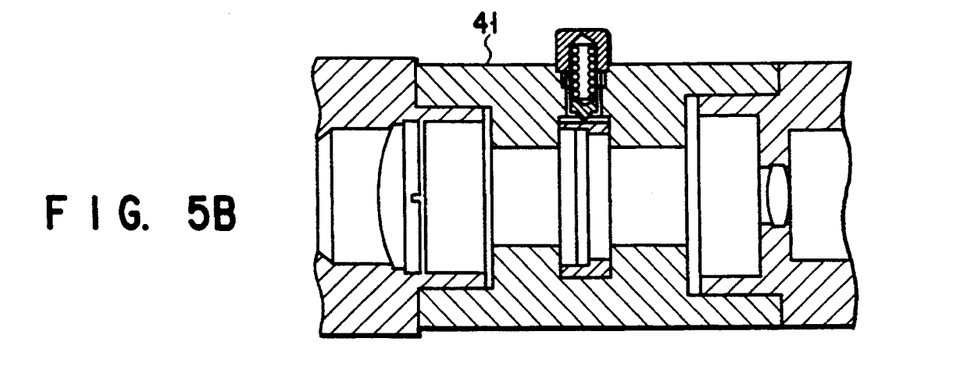
FIG. 5B is a sectional view of the filter selecting mechanism used in the reflected fluorescence microscope according to the second embodiment of the present invention.

FIGS. 5A and 5B are views for explaining the second embodiment of the present invention.

In the second embodiment, a filter selecting mechanism is used in place of a filter holding mechanism shown in FIG. 2. Referring to FIG. 5A, reference numeral 41 denotes a tube body constituting part of the light projection tube; 42, a slider for inserting and removing a through hole and a plurality of filters in and from the optical path; 43a, a through hole; 43b and 43c, filters (to be described later) used in this embodiment; 44a to 44c, positioning click grooves for the through hole 43a and the filters 43a and 43b, respectively; 45, a pin for fitting and fixing the slider 42 by fitting it in the click holes 44a to 44c; 46, a coil spring for pressing the pin 45; and 47, a spring receptacle, fixed to the tube body 41, for supporting the pin 45 and the coil spring 46.

Figure 6A:
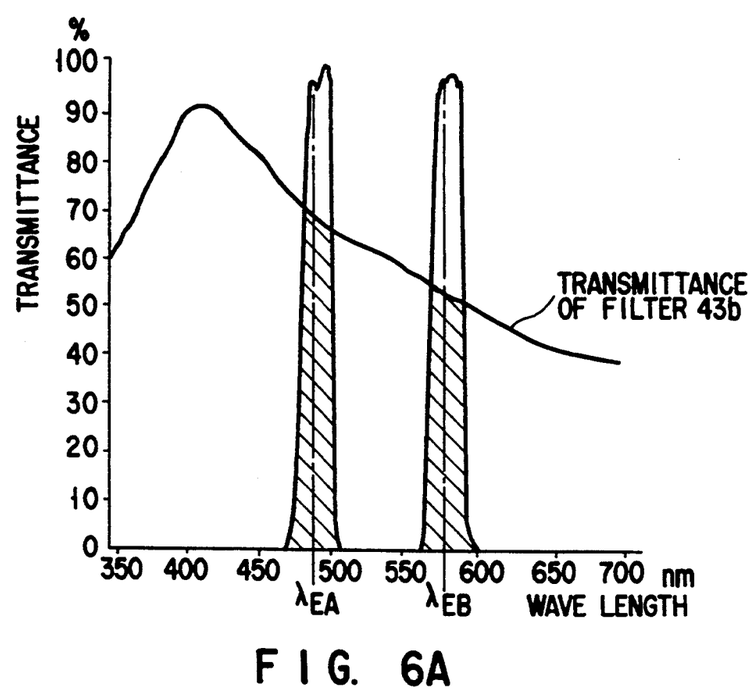
FIG. 6A is a graph showing the filter characteristics of a filter having a high transmittance in the short wavelength side and a low transmittance in the long wavelength side, and the wavelength of excitation light when such a filter and an excitation filter are used.
Figure 6B:
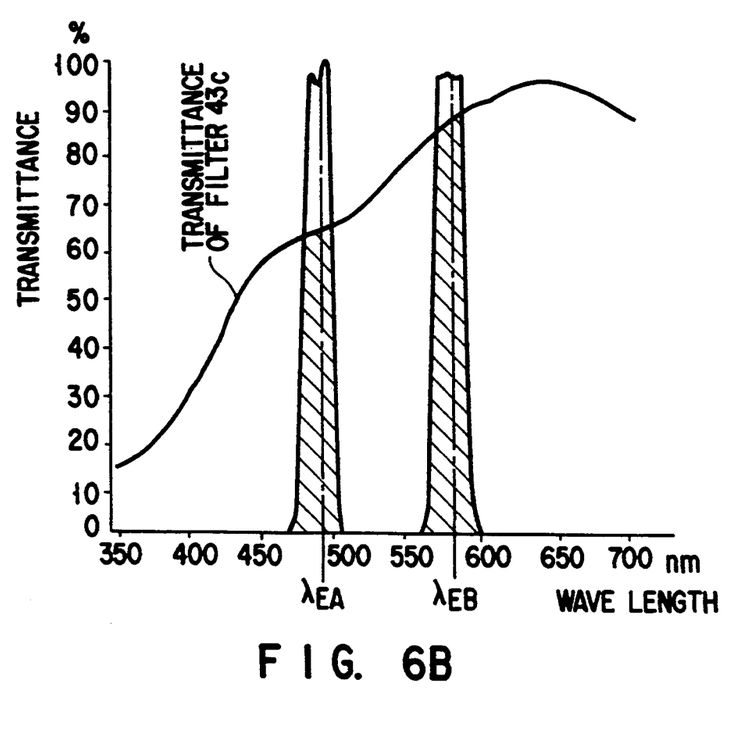
FIG. 6B is a graph showing the filter characteristics of a filter having a low transmittance in the short wavelength side and a high transmittance in the long wavelength side, and the wavelength of excitation light when such a filter and an excitation filter are used.

When the filters 43b and 43c having the filter mechanisms as described above are combined with the excitation filter 16, the obtained excitation light appears to have wavelengths as indicated by the hatched portions in FIGS. 6A and 6B.

Especially, in FIG. 6A, since the filter 43b has a high transmittance with respect to the short excitation wavelength band $\lambda_{EA}$ and a low transmittance with respect to the long excitation wavelength band $\lambda_{EB}$, which two types of excitation wavelength bands $\lambda_{EA}$ and $\lambda_{EB}$ being obtained by the excitation filter 16, of the intensities of the two types of excitation wavelength bands $\lambda_{EA}$ and $\lambda_{EB}$, the intensity of the long excitation wavelength band $\lambda_{EB}$ is lower than that of the short excitation wavelength band $\lambda_{EA}$. As a result, the ratio of the fluorescent intensities of the two types of fluorescences excited by the excitation wavelength bands $\lambda_{EA}$ and $\lambda_{EB}$ changes at a predetermined rate in accordance with a change in ratio of the excitation light intensities when compared to the ratio of the same obtained when the filter 43b is not inserted in the optical path.

In FIG. 6B, since the filter 43c has a low transmittance with respect to the short excitation wavelength band $\lambda_{EA}$ and a high transmittance with respect to the long excitation wavelength band $\lambda_{EB}$, which two types of excitation wavelength bands $\lambda_{EA}$ and $\lambda_{EB}$ being obtained by the excitation filter 16, of the intensities of the two types of excitation wavelength bands $\lambda_{EA}$ and $\lambda_{EB}$, the intensity of the long excitation wavelength band $\lambda_{EB}$ is higher than that of the short excitation wavelength band $\lambda_{EA}$. As a result, the ratio of the fluorescent intensities of the two types of fluorescences excited by the excitation wavelength bands $\lambda_{EA}$ and $\lambda_{EB}$ changes at a predetermined rate in accordance with a change in ratio of the excitation light intensities when compared to the ratio of the same obtained when the filter 43c is not inserted in the optical path.

Therefore, when the through hole 43a and the filters 43b and 43c are appropriately selected by the slider 42, the ratio of the intensities of the excitation lights having the bands $\lambda_{EA}$ and $\lambda_{EB}$ can be appropriately changed at a predetermined rate from the value obtained when only the excitation filter 16 is used to the ratio represented by the hatched portions in FIG. 6A or to the ratio represented by the hatched portions in FIG. 6B, and the ratio of the intensities of the two types of fluorescences excited by the excitation wavelength bands $\lambda_{EA}$ and $\lambda_{EB}$, which ratio being equivalent to the ratio of the intensities of the excitation lights having the bands $\lambda_{EA}$ and $\lambda_{EB}$, can be adjusted at an arbitrary predetermined rate.

Since the gradient of the transmittance characteristics of the filters 43b and 43c can be arbitrarily designed, the ratio of the intensities of the two types of fluorescences excited by the excitation wavelength bands $\lambda_{EA}$ and $\lambda_{EB}$ can be freely set by the design of the employed filters 43b and 43c in accordance with the fluorochromes and the state of the specimen 20.

Therefore, according this embodiment having this arrangement, when the difference in fluorescent intensity or discoloration state between two types of fluorochromes is known, the ratio of the intensities of the two types of fluorescences can be quickly changed only by switching the slider 42, and a fluorescent image which is easy to observe can be obtained by eliminating a variation in brightness of the fluorescent image among the fluorochromes during observation and photographing. Furthermore, since adjustment can be performed by controlling illumination light, the degradation in excitation efficiency as described above will not occur, and no extra damage will be applied to the specimen 20.

In this embodiment, the two types of filters 43b and 43c are used in the slider 42. However, a plurality of demands according to the favor of the user or the state of microscopic observation can be dealt with by using a plurality of (e.g., one or more) types of a plurality of filters and sliders corresponding to them.

The third embodiment of the present invention will now be described.

Figure 8:
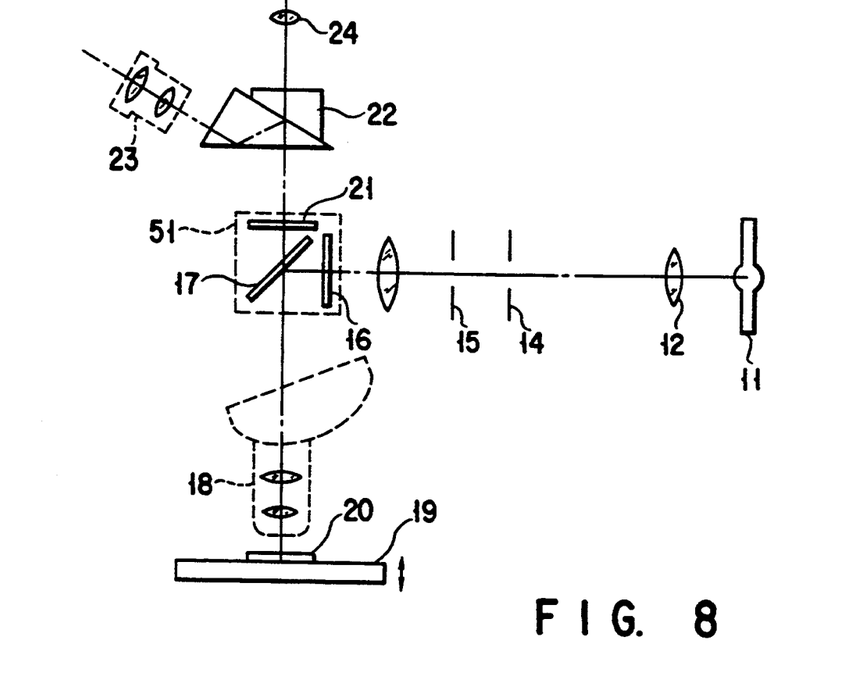
FIG. 8 is a view showing the arrangement of the optical system of a reflected fluorescence microscope according to the third embodiment of the present invention.
Figure 9:
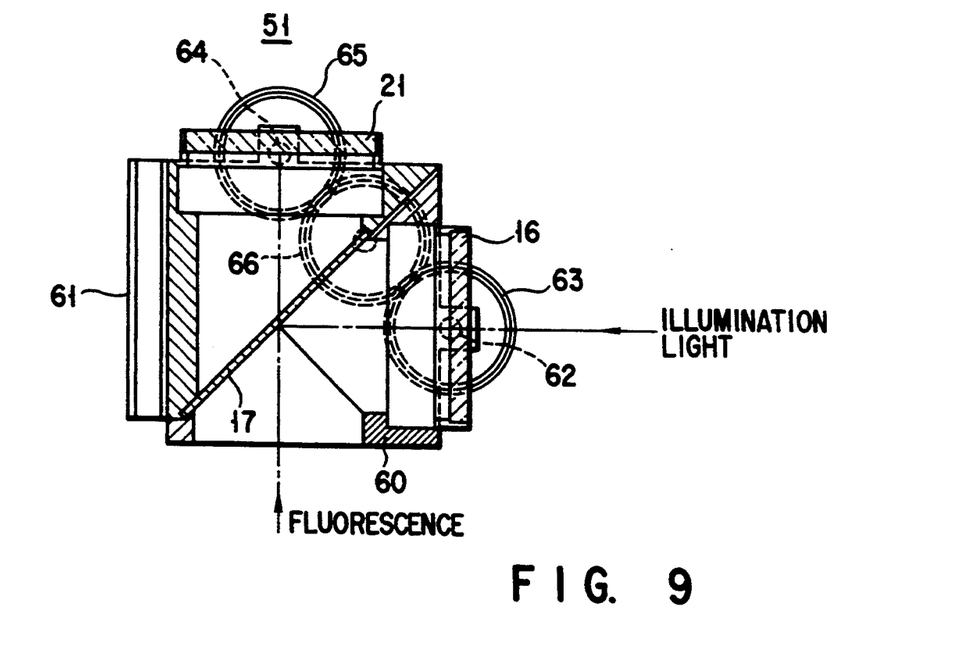
FIG. 9 is a sectional view of a fluorescent filter set provided to the reflected fluorescence microscope according to the third embodiment.

FIG. 8 shows the arrangement of the optical system of a reflected fluorescence microscope according to the third embodiment, and FIG. 9 shows a fluorescent filter set provided to this optical system. The same constituent elements as those in the first and second embodiments described above are denoted by the same reference numerals.

In the first and second embodiments, the transmission wavelength range is shifted by a filter provided midway along the light projection tube. In the third embodiment, the transmission wavelength range is shifted by operating an excitation filter and an absorption filter.

Figure 10:
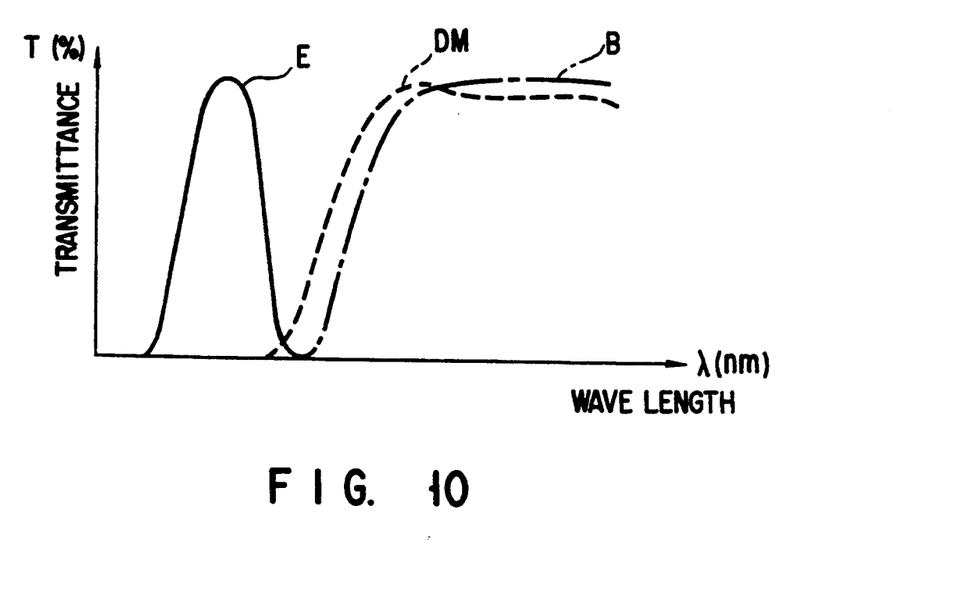
FIG. 10 is a graph showing the transmittance characteristics of the fluorescent filter set shown in FIG. 9.

In the reflected fluorescence microscope of the third embodiment, the beam emitted from a light source 11 is collected by a collector lens 12 and is incident on an excitation filter 16, having the transmittance characteristics indicated by a solid line E in FIG. 10, through an aperture stop 14, a field stop 15, and another collector lens. The beam transmitted through the excitation filter 16 becomes excitation light having a predetermined excitation wavelength, is incident on a dichroic mirror 17 disposed on the observation optical axis and having the transmittance characteristics indicated by a broken line DM in FIG. 10, and is reflected toward a specimen 20. The excitation light incident on the observation optical axis is projected onto the specimen 20 through an objective lens 18.

The specimen 20 irradiated with the excitation light emits a fluorescence having a wavelength longer than that of the excitation light. The fluorescence from the specimen 20 which has such wavelength characteristics is incident on the objective lens 18 and then on an absorption filter 21, having the transmittance characteristics indicated by an alternate long and short dashed line B in FIG. 10, through the dichroic mirror 17.

When the transmittance characteristics of the absorption filter 21 are set in accordance with the wavelength characteristics of the fluorescence emitted by the specimen 20, only the fluorescence is transmitted through the absorption filter 21. The excitation filter 16, the dichroic mirror 17, and the absorption filter 21 constitute a fluorescent Filter set 51.

The fluorescence from the specimen 20 passing through the absorption filter 21 is incident on a prism 22 disposed on the observation optical axis, and its optical path is branched into an observation optical system in which an eyepiece 23 is disposed and a photographing optical system in which a photographing lens 24 is disposed.

FIG. 9 shows the practical arrangement of the fluorescent filter set 51. The fluorescent filter set 51 has a columnar through port at its central portion and a fluorescent cube 60 having an opening communicating with this through port on its one side surface, as shown in FIG. 9. The excitation filter 16 is disposed in the opening of this fluorescent cube 60, the absorption filter 21 is disposed on one end of the through port, and the dichroic mirror 17 is disposed in a position of the through port opposing the opening at an angle of 45°. A mounting portion 61 for detachably mounting the fluorescent filter set 51 to the microscope body is formed on the other side surface of the fluorescent cube 60.

The excitation and absorption filters 16 and 21 are constituted by interference filters formed of dielectric multilayer films. The excitation filter 16 is supported by a rotating shaft 62 perpendicular to the optical axis, and the rotating shaft 62 is supported on the fluorescent cube 60 by bearings. Thus, the excitation filter 16 is pivotal about the axis perpendicular to the optical axis. A gear 63 pivotally supported on the fluorescent cube 60 is mounted to one end of the rotating shaft 62.

The absorption filter 21 is supported on a rotating shaft 64 perpendicular to the optical axis and supported on the fluorescent cube 60 by bearings. Thus, the absorption filter 21 is also pivotal about the axis perpendicular to the optical axis. A gear 65 pivotally supported on the fluorescent cube 60 by bearings is mounted on one end of the rotating shaft 64.

The gear 63 of the excitation filter 16 and the gear 65 of the absorption filter 21 are coupled to each other through a gear 66 rotatably supported on the fluorescent cube 60 by bearings, thereby constituting an interlock mechanism.

The angles (incident angles of the beams) of the excitation and absorption filters 16 and 21 defined with the corresponding optical axes are changed in the interlocked manner. Note that the gear speed reducing ratio of the gears 63, 65, and 66 is set such that the shift amounts of the cutoff wavelengths obtained by inclining the excitation and absorption filters 16 and 21 with respect to the corresponding optical axes become equal to each other.

The relationship between the changes in angle of reflected light on the excitation and absorption filters 16 and 21 and the maximum transmittance characteristic range will be described. As described above, when the incident angle of the interference filter is increased, the maximum transmittance characteristic range is gradually shifted to the short wavelength side.

Figure 11:
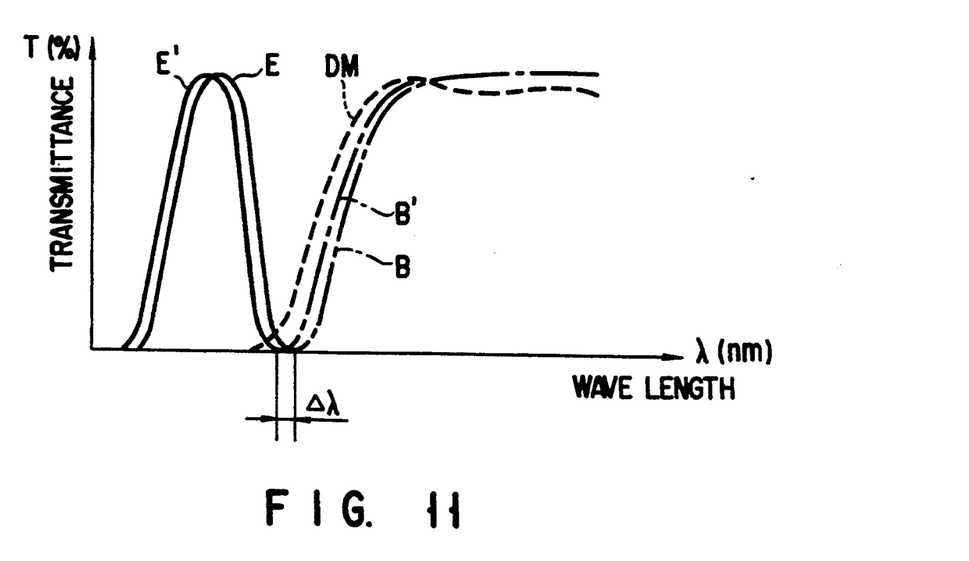
FIG. 11 is a graph showing a shift in transmittance characteristics caused by moving the fluorescent filter set shown in FIG. 9.

For this reason, when the planes of incidence of the excitation and absorption filters 16 and 21 constituted by the interference filters having the characteristics as described above are gradually inclined from the state perpendicular to the corresponding optical axes, the transmittance characteristics E and B of the excitation and absorption filters 16 and 21, respectively, are shifted to the short wavelength side by $\Delta\lambda$ to become transmittance characteristics E' and B', respectively, as shown in FIG. 11.

In the embodiment having the arrangement as described above, when either one of the gears 63, 65, and 66 is rotated, the remaining two gears are rotated through the gear 66 in the interlocked manner, and the excitation and absorption filters 16 and 21 integral with the gears 63 and 65, respectively, are pivoted about the rotating shafts 62 and 64, respectively.

As a result, the incident angles of the beams incident on the excitation and absorption filters 16 and 21 are changed, so that the transmittance characteristics E and B of the excitation and absorption filters 16 and 21, respectively, are shifted, as described above.

Accordingly, when a manufacturing error is present in any one of the excitation and absorption filters 16 and 21 and the dichroic mirror 17 constituting the fluorescent filter set, or when the optimum excitation state is changed due to a change in the state of the specimen 20, the excitation and absorption filters 16 and 21 may be rotated to adjust the corresponding transmittance characteristics E and B to optimum states, as described above, so that the fluorescent image of the specimen 20 can always be observed in the optimum excitation state without exchanging the fluorescent filter set. Therefore, a degradation in fluorescent image, which is caused since the transmittance characteristics of the excitation and absorption filters 16 and 21 do not match the fluorochromes, can be reliably prevented, thereby improving the observation performance.

Since the transmittance characteristics of the excitation and absorption filters 16 and 21 can be continuously changed by the single fluorescent filter set 51, an excitation switching operation becomes unnecessary, thus improving the operability. Furthermore, since the transmittance characteristics can be continuously changed, the single fluorescent filter set 51 can set optimum excitation conditions for a large number of specimens, resulting in a reduction in the number of components and the manufacturing costs.

various modifications of the present invention having arrangements associated with the fluorescent filter set will be described with reference to FIGS. 12 to 16.

Figure 12:
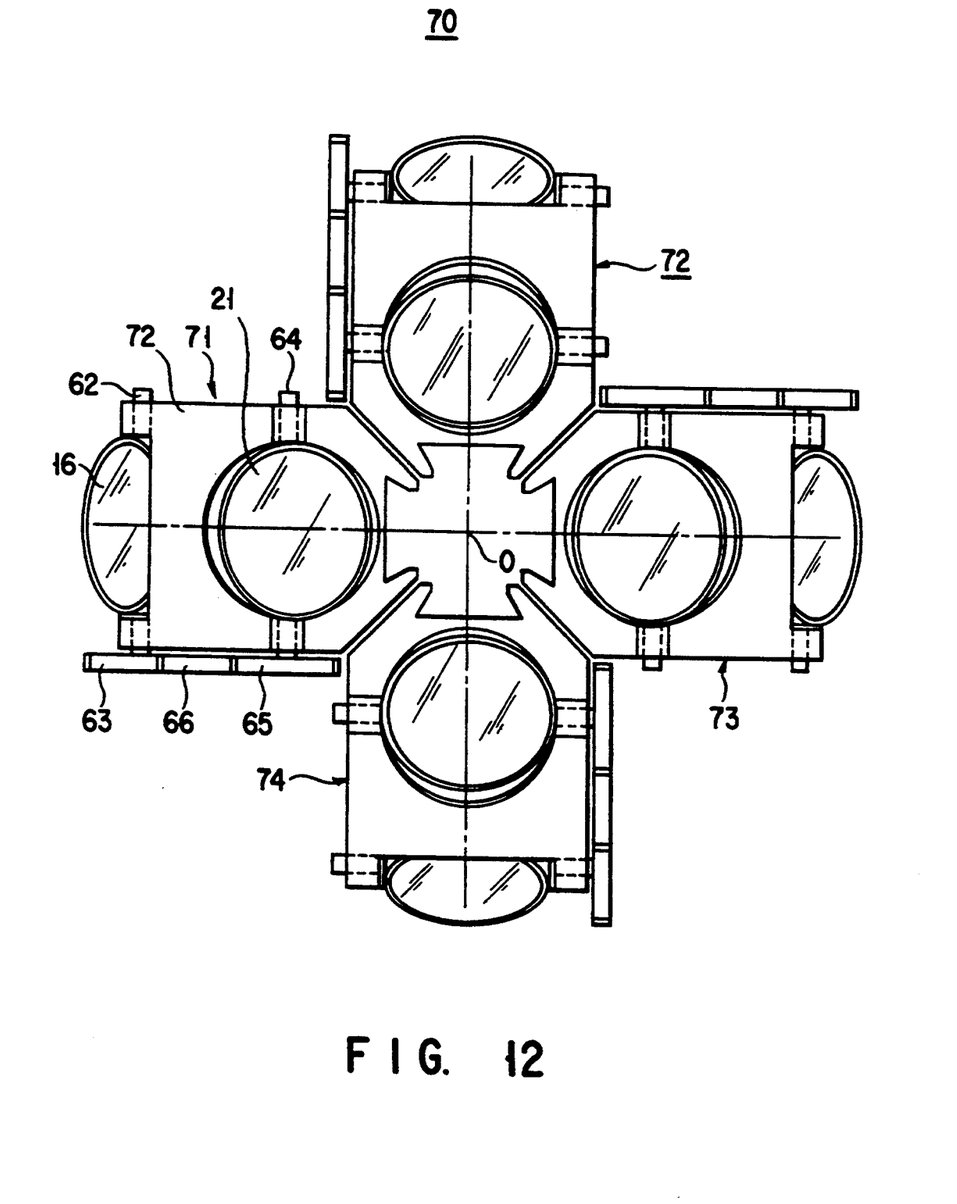
FIG. 12 is a view showing the first modification of a portion associated with the fluorescent filter set.
Figure 13:
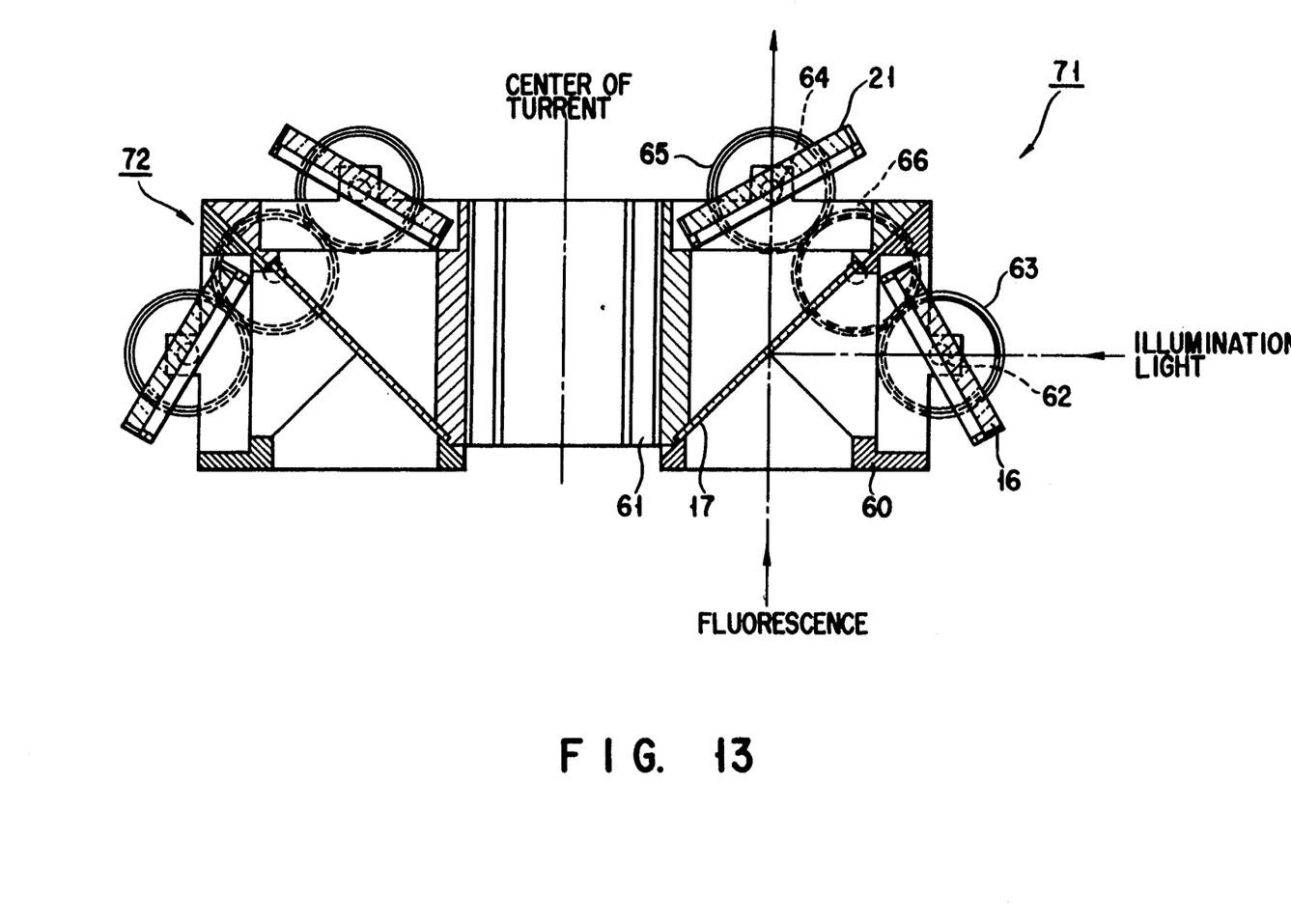
FIG. 13 is a sectional view of the first modification.

In the first modification shown in FIG. 12, four different types of fluorescent filter sets 71 to 74 are held by a turret having a rotating axis parallel to the observation optical axis, so that an arbitrary fluorescent filter set can be removed from and inserted in the observation optical path. FIG. 13 shows the section of the fluorescent filter set 71 disposed on the observation optical path.

The respective fluorescent filter sets 71 to 74 have different transmittance characteristics, and the arrangement of each fluorescent filter set is substantially the same as that of the fluorescent filter set 51 described in the third embodiment. More specifically, an excitation filter 16 is disposed in the light source-side opening of a fluorescent cube 60 together with a rotating shaft 62 to be pivotal about the rotating shaft 62, and an absorption filter 21 is disposed in the prism-side opening of the through port of the fluorescent cube 60 together with a rotating shaft 64 to be pivotal about the rotating shaft 64. A gear 63 is concentrically fixed to one end of the rotating shaft 62, and a gear 65 is concentrically fixed to one end of the rotating shaft 64. The rotating shafts 62 and 64 project from a side surface of the fluorescent cube 60. The gears 63 and 65 are coupled by a gear 66.

According to this modification having the arrangement as described above, the transmittance characteristics of excitation and absorption filters 16 and 21 can be continuously changed by the fluorescent filter sets 71 to 74. In addition, when the wavelengths of light emitted by fluorochromes are largely different, the turret is rotated to dispose a fluorescent filter set having appropriate transmittance characteristics on the optical path, thereby obtaining optimum excitation conditions.

Figure 14:
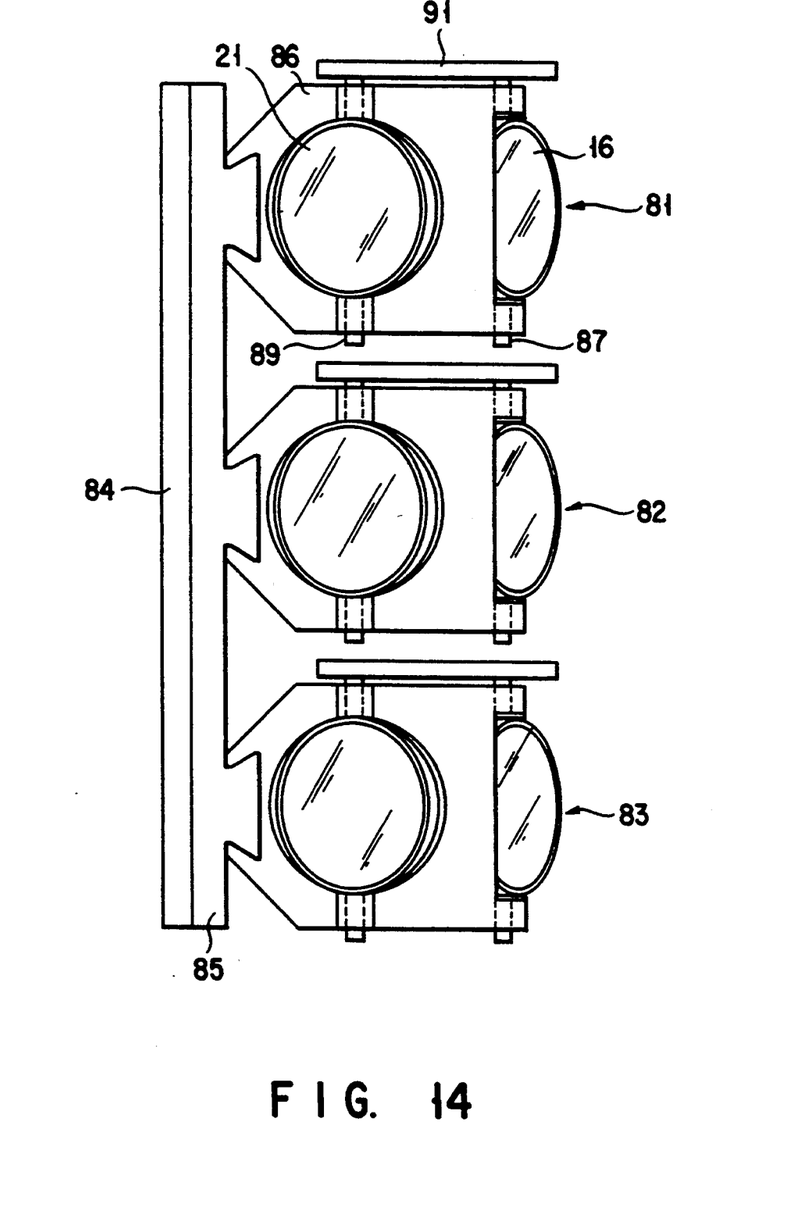
FIG. 14 is a view showing the second modification of the portion associated with the fluorescent fluorescence set.
Figure 15:
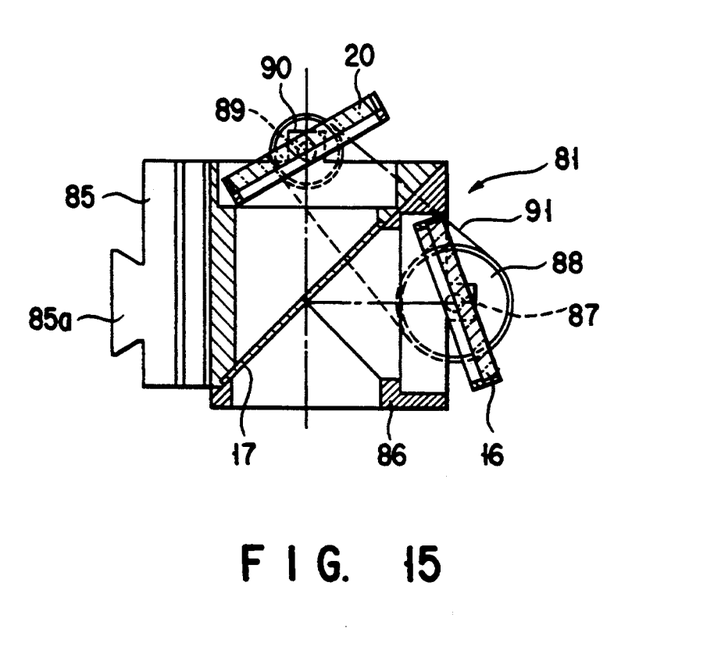
FIG. 15 is a sectional view of the second modification.

In the second modifications shown in FIGS. 14 and 15, three different types of fluorescent filter sets 81 to 83 can be removably inserted in the observation optical path, and excitation and absorption filters of each fluorescent filter set are interlocked by a belt.

In this modification, a guide member 84 is fixed at a location away from a location where each fluorescent filter set is to be disposed by a predetermined distance. A guide groove is formed in a surface of the guide member 84 opposing the observation optical axis to extend in a direction perpendicular to the observation optical axis. A slider 85 is mounted on the guide member 84 by slidably fitting a linear guide portion 85a in the guide groove. The three types of fluorescent filter sets 81 to 83 are mounted and fixed on the other surface of the slider 85 equidistantly.

Although the transmittance characteristics of the fluorescent filter sets 81 to 83 are different, their structures are the same. The structure of the fluorescent filter set 81 will be described as an example.

A fluorescent cube 86 has a shape similar to that of the tube body 31 described in the first embodiment. An excitation filter 16, integral with a rotating shaft 87, is supported in the light source-side opening of the fluorescent cube 86 to be pivotal about the rotating shaft 87. A pulley 88 is mounted on the rotating shaft 87.

An absorption filter 21, integral with a rotating shaft 89, is supported in the prism-side opening of the through port of the fluorescent cube 86 to be pivotal about the rotating shaft 89. A pulley 90 is mounted on the rotating shaft 89. A belt 91 extends between the two pulleys 88 and 90.

The ratio of the diameters of the pulleys 88 and 90 is set such that the shift amounts of the cutoff wavelengths obtained by inclining the excitation and absorption filters 16 and 21 with respect to the corresponding optical axes become equal to each other.

In the modification having the arrangement as described above, a desired fluorescent filter set (81, 82, or 83) is disposed on the observation optical path by moving the slider 85 along the guide member 84 in a direction perpendicular to the observation optical axis.

When the transmittance characteristics of the excitation and absorption filters 16 and 21 must be adjusted, the belt 91 is driven by a driving mechanism (not shown). Then, the excitation and absorption filters 16 and 21 are pivoted in the interlocked manner, so that the corresponding transmittance characteristics are shifted in predetermined directions, thereby setting optimum conditions.

Figure 16:
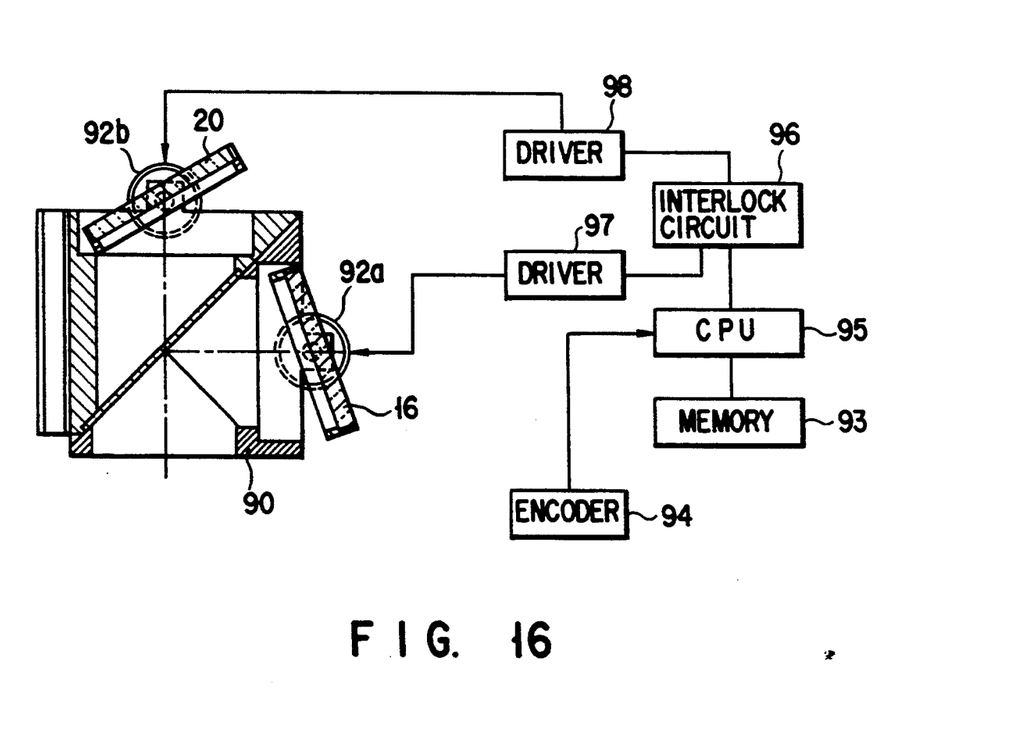
FIG. 16 is a view showing the third modification of the portion associated with the fluorescent filter set.

In the third modification shown in FIG. 16, excitation and absorption filters 16 and 21 are inclined in the interlocked manner by electrically driving them.

In this modification, stepper motors 92a and 92b for independently driving the excitation and absorption filters 16 and 21, respectively, of a fluorescent filter set are provided to a fluorescent cube 90.

Rotary angles of the excitation and absorption filters 16 and 21 with which the shift amounts of the cutoff wavelengths of the excitation and absorption filters 16 and 21 become equal to each other are stored in a memory 93. When an excitation wavelength shift signal is input from an encoder 94 to a CPU 95, an interlock circuit 96 calculates the driving amounts of the excitation and absorption filters 16 and 21 with which the shift amounts of the cutoff wavelengths of the excitation and absorption filters 16 and 21 become equal to each other.

When the calculation results obtained by the interlock circuit 96 are output to drivers 97 and 98 to drive the stepper motors 92a and 92b, respectively, the excitation and absorption filters 16 and 21 can be inclined by desired amounts in the interlocked manner.

In this modification, since the rotary angle data are stored in the memory 93, even if the interlocked relation between the excitation and absorption filters 16 and 21 is not constant, an arbitrary control operation can be performed in accordance with the rotary angle data.

The present invention is not limited to the embodiments and modifications described above, and various other modifications can be made without departing from the spirit and scope of the invention.

What is claimed is:

1. A reflected fluorescence microscope having an optical system, for observing a fluorescent image of a stained specimen illuminated by reflected illumination, comprising:

light source means for supplying a light to said optical system for the reflected illumination;

excitation light generating means, disposed on an optical path between said light source means and said optical system, for converting the light from said light source means into a plurality of narrow-band excitation lights each having narrow bands components;

a dichroic mirror, disposed on an optical path of said optical system on which the narrow-band excitation lights from said excitation light generating means and the fluorescent image from said specimen are incident, said dichroic mirror reflecting to the specimen the narrow-band excitation lights emerging from said excitation light generating means and transmitting therethrough the fluorescent image from the specimen that emits a plurality of types of fluorescences upon being excited by the narrow-band excitation lights;

absorption filter means for absorbing an extra wavelength component from the fluorescent image emerging from said dichroic mirror; and filter means, disposed on said optical path between said optical system and said light source means, for varying a ratio in intensity between a pair of narrow-band excitation lights included in the plurality of narrow-band excitation lights, thereby effecting switching between at least a first state and a second state, a wavelength of one of said pair of narrow-band excitation lights being shorter than a wavelength of the other of said pair of narrow-band excitation lights, and wherein said filter means in the first state has first transmittance characteristics having a low transmittance at a wavelength band of said one of said pair of narrow-band excitation lights and a high transmittance at a wavelength band of said other of said pair of narrow-band excitation lights, and said filter means in the second state has second transmittance characteristics having a high transmittance at a wavelength band of said one of said pair of narrow-band excitation lights and a low transmittance at a wavelength band of said other of said pair of narrow-band excitation lights.

2. A microscope according to claim 1, wherein said filter means is selectively changeable between first transmittance characteristics wherein the transmittance is continuously increased from a short wavelength side to a long wavelength side within a predetermined wavelength range to form a first transmission wavelength band, and second transmittance characteristics wherein the transmittance is continuously decreased from the long wavelength side to the short wavelength side within a predetermined wavelength range to form a second transmission wavelength band.

3. A microscope according to claim 2, wherein said filter means includes:

a plurality of filters each having different transmittance characteristics, said plurality of filters including at least a first filter having the first transmittance characteristics and a second filter having the second transmittance characteristics; and a selecting mechanism for selectively changing said plurality of filters.

4. A microscope according to claim 3, wherein said selecting mechanism includes:
   a tube body constituting part of a light projection tube that forms the optical path between said light source means and said dichroic mirror;
   a slider member held by said tube body to be slidable in a direction perpendicular to an optical axis;
   a plurality of mounting portions linearly formed in said slider member to extend in a sliding direction of said slider member and on which said filters are mounted; and
   a positioning mechanism for positioning said slider member at a position where each of said filters coincides with the optical axis.

5. A microscope according to claim 1, wherein said filter means includes an interference filter, the transmission wavelength band of which is shifted in accordance with an incident angle of narrow-band light, and a rotary mechanism for rotatably supporting said interference filter so as to change the incident angle of the narrow-band light.

6. A microscope according to claim 5, wherein said rotary mechanism includes a tube body constituting part of a light projection tube that forms the optical path between said light source means and said dichroic mirror, a filter frame, fitted in said tube body, for rotatably holding said interference filter in an axis perpendicular to an optical axis, a pin member movable to push said filter frame, a spring member for pushing said pin member, and a spring receptacle member, fixed to said tube body, for supporting said pin member and said spring member.

7. A microscope according to claim 1, wherein said filter means comprises an interference filter having transmittance characteristics and forming a trapezoidal transmission wavelength band, and wherein the trapezoidal transmission wavelength band is shifted by inclining said interference filter.

8. A reflected fluorescence microscope, having an optical system, for observing a fluorescent image of a stained specimen illuminated by reflected illumination, comprising:
   light source means for supplying a light to said optical system used for the reflected illumination;
   at least one fluorescent filter unit including an excitation filter, disposed on an optical path between said light source means and said optical system, for converting the light from said light source means into a plurality of narrow-band excitation lights, a dichroic mirror disposed on an optical path of said optical system on which the narrow-band excitation lights from said excitation filter and the fluorescent image lights; from said specimen are incident, said dichroic mirror reflecting the narrow-band excitation lights emerging from said excitation filter to the specimen and transmitting therethrough the fluorescent image from the specimen that emits a fluorescence upon being excited by the narrow-band excitation lights, and an absorption filter disposed on said optical path of said optical system on which the fluorescent image emerging from said dichroic mirror are incident, said dichroic mirror absorbing an extra wavelength component from the fluorescent image and transmitting therethrough a wavelength component of the fluorescent image, said excitation and absorption filters each comprising interference filters each formed of a dielectric multilayer film and each being supported to be pivotal in an axis perpendicular to an optical axis; and
   an interlock mechanism for pivoting said excitation and absorption filters of said at least one fluorescent filter unit in an interlocked manner.

9. A microscope according to claim 8, further comprising a selecting mechanism, having a plurality of said fluorescent filter units, for selectively inserting and removing respective ones of said fluorescent filter units in and from an optical path.

10. A microscope according to claim 9, wherein said selecting mechanism comprises a turret mechanism having a rotating axis parallel to the optical path and radially holding said plurality of fluorescent filter units within a plane perpendicular to the rotating axis.

11. A microscope according to claim 9, wherein said selecting mechanism comprises a slider mechanism, held to be slidable in a direction perpendicular to the optical path, for holding said plurality of fluorescent filter units in a sliding direction thereof.

12. A microscope according to claim 8, wherein said interlock mechanism comprises:
   a first gear having a rotation center to which a rotating shaft of said excitation filter is fixed;
   a second gear having a rotation center to which a rotating shaft of said absorption filter is fixed; and
   an intermediate gear meshing with both of said first and second gears.

13. A microscope according to claim 8, wherein said interlock mechanism comprises:
   a first pulley having a rotation center to which a rotating shaft of said excitation filter is fixed;
   a second pulley having a rotation center to which a rotating shaft of said absorption filter is fixed; and
   a coupling belt looped between said first and second pulleys.

14. A microscope according to claim 8, wherein said interlock mechanism comprises driving means for driving rotating shafts of said excitation and absorption filters in electrical synchronism with each other.

* * * * *